United States Patent [19]

Koz

[11] Patent Number: 5,249,164
[45] Date of Patent: Sep. 28, 1993

[54] DIGITAL COLOR TV FOR PERSONAL COMPUTERS

[76] Inventor: Mark C. Koz, 355 N. Wolfe Rd., Sunnyvale, Calif. 94086

[21] Appl. No.: 683,593

[22] Filed: Apr. 9, 1991

Related U.S. Application Data

[63] Continuation-in-part of Ser. No. 545,352, Jun. 27, 1990, abandoned.

[51] Int. Cl.⁵ .............................................. H04N 9/00
[52] U.S. Cl. .................................... 358/21 R; 358/903
[58] Field of Search ............. 340/701, 744; 358/21 R, 358/160, 903

[56] References Cited

U.S. PATENT DOCUMENTS

| | | | |
|---|---|---|---|
| 4,647,968 | 3/1987 | Willis | 358/141 |
| 4,730,185 | 3/1988 | Springer et al. | 340/701 |
| 4,800,423 | 1/1989 | Appiano et al. | 358/21 R |
| 4,811,407 | 3/1989 | Blokker, Jr. et al. | 358/903 X |
| 4,956,638 | 9/1990 | Larky et al. | 340/701 |
| 5,021,873 | 6/1991 | Abumi | 358/160 X |
| 5,111,296 | 5/1992 | Duffield et al. | 358/903 X |
| 5,119,074 | 6/1992 | Greaves et al. | 340/701 |
| 5,138,303 | 8/1992 | Rupel | 340/703 |

OTHER PUBLICATIONS

"A Hybrid Scheme for Color Dithering," Sloan, K., Proceedings of the SPIE-The International Society for Optical Engineering, vol. 1249, pp. 238-248, Conference Title: Human Vision and Electronic Imaging: Models, Methods and Applications. Conference Date: Feb. 12-14, 1990.

"Improved Dithering Methods for Colour Quantized Images," Watanabe, T., Transactions of the Institute of Electronics, Information and Communication Engineers D-II, vo. J72D-II, No. 7, pp. 985-992, Jul. 1989.

Primary Examiner—Mark R. Powell
Attorney, Agent, or Firm—Donald E. Schreiber

[57] ABSTRACT

On a single plug-in card of standard dimensions for insertion in a desk model computer are mounted all the necessary components to provide display on a portion of the computer screen as selected and controlled by the computer, a television picture or similar compatible display, and reproduce an associated audio signal. The miniature television adapter functions within the operating cycle of a host computer capable of operating in a multi-program with split or overlay display screen capability. It does not preempt or override any normal computer functions. Its specially designed signal processing and data word assembly and delivery circuitry make possible delivery of a digitally formatted television data stream at a sufficient speed to enable display according to the model of the device of either black and white or color television images at a rate of thirty frames per second when used with a computer of sufficient operating speed. In its color version, the invention processes the color signal to produce many more colors than the standard palette and also may provide a higher resolution color image at a slower rate.

7 Claims, 8 Drawing Sheets

DIGITAL COLOR TV FOR PERSONAL COMPUTERS

NATURE OF THIS APPLICATION

This application is a continuation-in-part of earlier application Ser. No. 07/545,352 filed Jun. 27, 1990 (now abandoned), titled MICRO TV FOR PERSONAL COMPUTERS. The earlier application, for which priority is claimed, disclosed and claimed, a plug-in card for personal computers for display of a black and white television picture on a portion of the viewing screen. The current application discloses and claims a more complex version of the invention providing selection of two types of color pic-picture display in two different sizes.

TECHNICAL FIELD

The invention is in the field of video display on a personal computer (PC). More particularly, it concerns the display of a television (TV) picture or other analog visual signal on a portion of the cathode ray tube (CRT) or monitor of a PC while the PC is running other programs. The invention comprises a standard plug-in card for a desk-type computer or work station, on which card is an all-channel television tuner which is adapted to continuously tune through all standard television channels as well as the broadcast FM frequency spectrum, and all necessary circuitry and components to demodulate the selected TV signal (or other similar analog visual signal, such as a closed-circuit surveillance, test monitoring or security system camera or playback from a video cassette recorder (VCR), digitize it, store these digitally encoded signals in a temporary memory, and through a novel multi-word buffer stage transfer the stored signals to the computer when requested during its operating cycle for display in a selected portion of its screen along with other displayed material under control of the host computer's central processor. The invention will produce picture data for display at a rate of thirty picture frames per second, which is the standard transmitted rate or broadcast and/or closed-circuit television. This picture frame rate is required for smooth motion display, and will be referred to in this specification as "real time" display or processing. In its color version, the invention also provides a slower picture display of much higher resolution, in a freeze frame or similar mode.

The invention described primarily herein will be referred to as the DigiVideo, particularly meaning its color version. Two different sizes of picture display on the associated PC may be produced. The invention is most efficiently adaptable to a computer which uses 32-bit words and has sufficient operating speed to achieve real time display, thus being particularly compatible with the Macintosh II. It is this version which will be described in detail, although the invention could be adapted to be functional in the large group of computers known as IBM (International Business Machines) compatibles and/or clones, using a common basic processing scheme and language, Micro-soft Disk Operating System (DOS) having resident either Windows 386 or Operating System/2 (OS/2). While the invention could be adaptable to the UNIX software system, in its present form it would be unable to accomodate display of 30 picture frames per second. Certain processing differences are required by variations in basic personal computers.

(The disclosure will include an earlier black and white design operating in the same manner. The black and white version provided two models delivering different picture sizes, called the MicroTV for the smaller display, DigiVideo for a unit capable of producing both display sizes.)

BACKGROUND ART

The basic processing scheme of a personal computer does not directly facilitate display of visual images showing continuous motion, as particularly exemplified by standard television transmissions. Processing and displaying pictures at this real time rate involves handling a relatively large data stream.

It can readily be seen there are numerous potential uses for the capability of viewing a motion picture or TV type image on an inset portion of a PC screen. In addition to merely watching television, surveillance and security systems come to mind-comparing a closed-circuit view of a person with file copies of photographs and clearance or authorization, for example. Viewing of testing operations (e.g.: wind tunnels or displays of changing data such as oscillographs monitored by remote cameras) while reviewing or correcting calculated data is another possibility. Reviewing forensic simulations on magnetic tape recordings while preparing or reviewing commentary or testimony is another, as well as comparison of still file photographs therewith. Other applications are not difficult to conceive.

Visual images for display on a PC are made up of pixels, or discrete image elements, each pixel requiring an eight bit word for definition. It can be seen that the operating speed of a PC will determine whether or not it is possible to achieve motion display with the smoothness which is characteristic of the standard thirty frame per second real time rate. When the PC lacks sufficient speed to display real time motion, edited or intermittent motion display could still be very useful in many applications.

Prior art methods transmit only one pixel of video at a time on the computer's internal bus, resulting in a transmission time of as much as one second or more for a black and white image, considerably longer for color, which is clearly inadequate for smooth display of images involving motion.

Prior art devices for achieving display of moving images on a PC screen from analog sources have customarily provided extra processing capability to bypass the internal computer bus cycle processing or reduce the machine time required for the picture display. This results in an increase in equipment expense, as processors are relatively expensive, as well as increasing the bulk and installation complexity of the equipment.

Applicant is aware of two current art products which seek to achieve a result similar to the current invention.

1. A device called the MassMicro, selling for about $3,000, it is believed. This device requires two plug-in cards and includes its own video output card, producing a video overlay which it mixes directly with the picture displayed by the PC. The host PC's main processor never sees the data being processed by the MassMicro.

2. A device called the OrangeMicro, selling for about $4,000, it is believed. This device also requires two plug-in cards, and has its own processor, taking over the PC data bus as a bus master processor, so again the PC main processor never sees the data being handled by this device.

In addition to their expense, their requirement for two expansion slots in the PC, and their interference with control by the host PC, neither of these devices is capable of the data delivery speed necessary for smooth motion display on the PC screen.

The current invention provides, on a single plug-in video card at a much lower cost than either of the above-mentioned devices, smooth video motion at up to thirty frames per second. The current invention not only provides, by its novel data transfer stage, picture data at a much higher rate than either of the above devices, but does so under the master control of the host PC, rather than overriding its processing, as do the two devices mentioned above.

DISCLOSURE OF THE INVENTION

The invention comprises a plug-in computer card on which are disposed an all-channel television (TV) tuner and accompanying circuitry to provide a continuous TV picture which the user can display on a chosen portion of a computer screen. The display is controlled by the computer operator with software provided with the invention in conjunction with the basic operating system for the PC, while the PC is simultaneously used for other processing tasks.

The invention has the capability of providing to a PC for display on its screen an inset or overlay picture. While the mode of processing is essentially unchanged, the invention is available in models providing different capabilities: the frame displayed may be 128×128 pixels in the earlier black and white MicroTV model, the later models (DigiVideo, both color and black and white) provide either 128×128 pixels or 256×256 pixels, depending upon the machine and software with which it is used. Clearly, the larger picture requires four times as many pixels as the smaller, transmitted in the same period of time if real time display is to be achieved, which puts a premium on machine speed and capacity. In those personal computers having sufficient operating speed (e.g. the Macintosh II) this invention makes possible this real time display by transmitting pixels of picture data at a much higher rate than prior art methods.

For use for TV reception, an external antenna is required, and a standard F-type connector is provided. An additional F-type plug is provided for an alternate analog source, such as a video cassette recorder, and RCA pin-plug connectors are provided for separate audio input and output.

This disclosure section will discuss the color model and will reference the numbers on the system block diagram FIG. 1; subsequently the simpler black and white processing will be addressed. For simplicity the description herein will be addressed to TV reception displayed on a Macintosh II personal computer, but one skilled in the art can see how other sources may be substituted, and illustrative changes required for IBM compatible applications will be stated. It is noted, however, that all internal clocking for the DigiVideo processing is derived from the Macintosh 10 MHz clock, so that to use another computer clock changes may be required. It is further noted that in FIG. 1, control lines for the Intelligent Instruments Communications (I2C herein, a registered trademark of Phillips Signetics, a two line system using a clock line and a signal pulse line) system are not shown; instead each element controlled thereby is noted on the diagram in the bottom right corner of the element block.

In summary, the DigiVideo standard plug-in card for the Macintosh II connects with the Macintosh internal processing bus designated as the NuBus. The sequence of processing within the invention and within the host Macintosh computer is controlled by system software resident in a read-only memory (ROM) in the NuBus Driver and Xilinx configuration component 51. When the system is powered, this program loads instructions into the Xilinx field programmable gate array 50, and also loads a NuBus driver program into the Macintosh, for its picture control and decoding operations.

1. The desired channel of TV reception (or FM frequency) may be selected by keyboard control, or with the mouse, using software provided with the invention and installed in the PC. The software provides for tuning the TV tuner by voltage controlled oscillator, (VCO) utilizing "look-up" tables for the control frequency for each channel and for the voltage to the VCO to tune that frequency. Frequency control and stability are provided by the phase-locked-loop design of the tuner utilized. The actual tuning, as well as other switching and control operations within the invention, is controlled by use of the I2C control system mentioned above.

The incoming signal from the TV tuner goes to a a tuner/IF (intermediate frequency) Processor (21) which comprises two sections. The front end comprises a Phase Locked Loop (PLL) television band tuner which also includes the FM (frequency modulated) radio broadcast band. The tuner utilized in the invention is capable of continuous tuning from 50 to 809 Megaherz (MHz) of television broadcast channels, including frequency modulated (FM) broadcasts only in the FM radio broadcast band.

In the tuner section of this processor, the received RF is converted to a 45 MegaHertz (MHz) IF signal, which in the second section of the processor is detected to obtain an NTSC (National Television Standards Committee) video signal.

The output of the initial processor is directed to a video-audio multiplexer (22), which is essentially an analog switch to provide selection of either video from the tuner-processor or one of the alternate input from the other connector. This selection is again controlled by the I2C serial control system under computer control.

2. The audio signal from the video/audio multiplexer (hereinafter mux) is directed to an audio amplifier (23) and an audio switch (24) which switches it to either an external audio output pin-plug or to an internal speaker on the Digivideo board. The DigiVideo in its current form does not provide for demodulation and reproduction of standard FM radio broadcasts, but available components could provide this capability.

3. The video is directed both to an NTSC to RGB (red-green-blue) converter or video signal conditioning unit (31) and to a video synchronization (hereinafter sync) signal stripper (33).

The received television signal is processed in the video signal conditioner (31) which demodulates the video signal, and separates it into its color components indicating red, green and blue, the demodulation frequency is crystal stabilized at 3.579545 MegaHertz (MHz). Transfer of color components is controlled by the 10 MHz NuBus clock in the host Macintosh computer, which clock signal controls all Digivideo functions. In the signal conditioner, and in data transfer, the clock signal is divided according to the frame size selected—If the picture is 256×256 pixels, the storage and delivery clock rate is 5 MHz; if it is 128×128 pixels, the clock rate is 2.5 MHz.

Each of these color components is sent to one of three identical seven-bit analog to digital (A-D) converters (42, 43, and 44). These signals are also directed to an analog multiplexer 41 which selects either an 8-bit color mode for real time display or a 24-bit color mode for high resolution display.

The video signal conditioner is adapted to demodulate and process either the 3.5 MHz frequency band for United States standard TV broadcasts, or the 4.4 MHz band for the PAL (Phase Alternate Line) system used in European broadcasts, in which latter case the crystal reference frequency is 4.43 MHz.

The converter is controlled by a picture attribute controller (32) (again as directed by the host computer through the I2C control lines). This controller is an octal digital-analog controller using direct current (DC) drive level control to control several functions: hue, saturation, contrast and brightness in the television picture, as well as audio volume. The attribute controller also controls the level of a drive signal to (35), a novel picture enhancement circuit.

The video sync stripper (33) extracts the vertical and horizontal synchronization pulses from the video signal and provides them on separate lines to a Xilinx (TM) field programmable gate array which controls the delivery of the output data words to the Macintosh NuBus, as described hereinafter.

Figures 2, 2A:
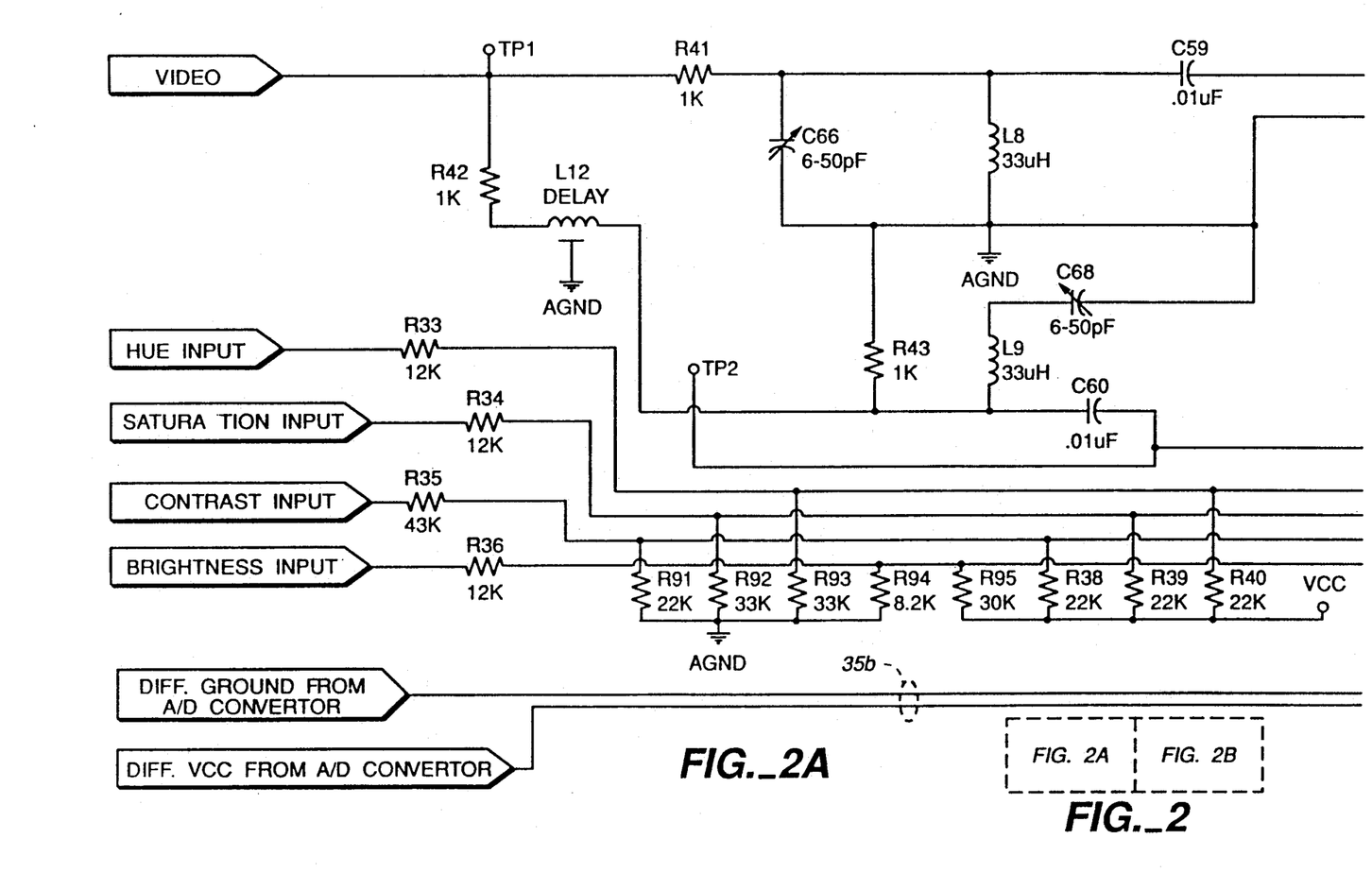
FIGS. 2, 2a and 2b are circuit diagrams of a portion of the video demodulation and conditioning circuitry with that portion constituting the dither circuit indicated.
Figure 2B:
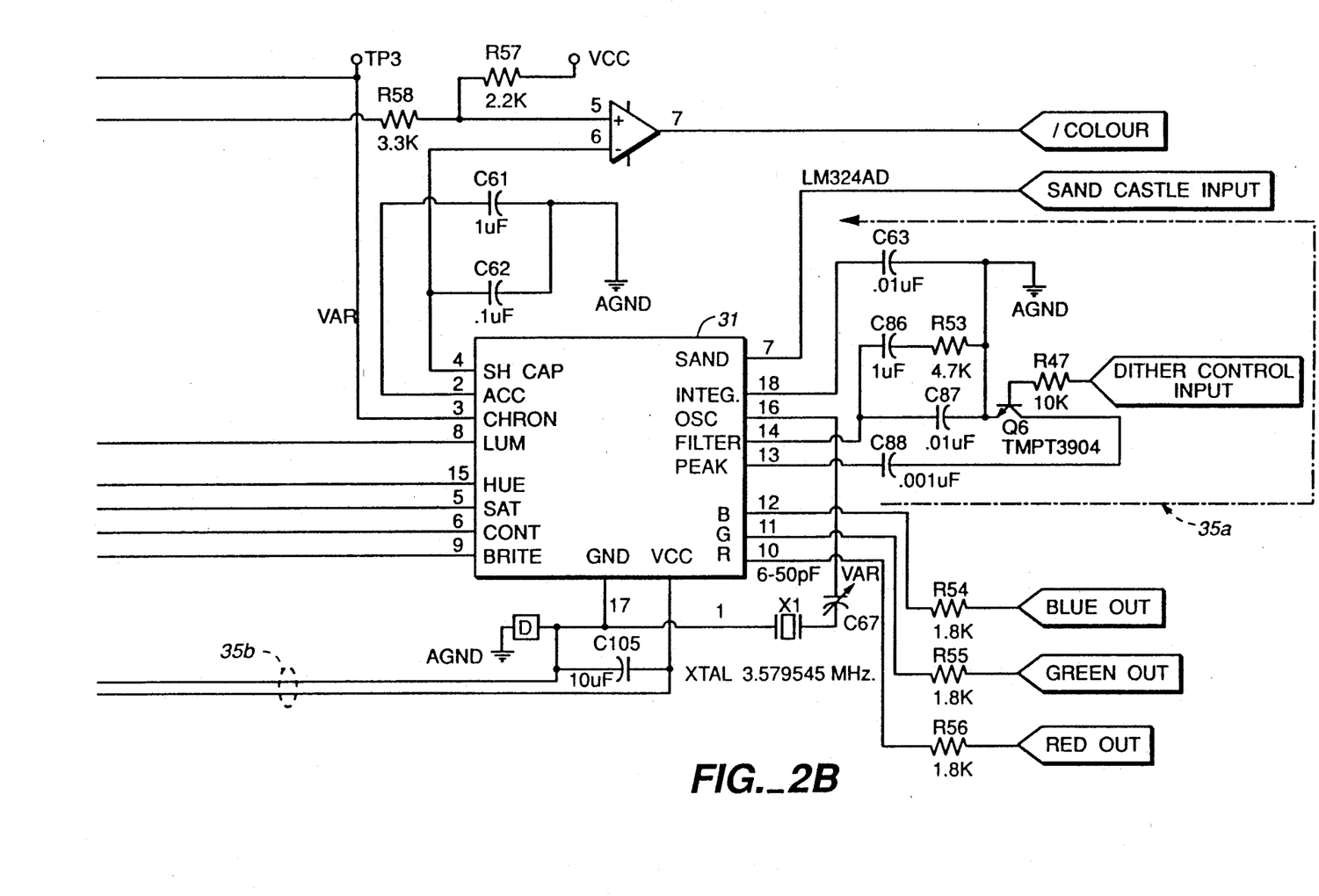

The video signal conditioning process includes a picture enhancement circuit, 35 also referred to herein as a dither control. The reference voltage and ground from the color component A-D converters (42, 43, and 44) are reintroduced into the NTSC to RGB converter or signal conditioner 31 after digitization in a positive feedback mode (FIG. 2 at 35b). These references carry a noise signal from the digitization which enhances the noise of the color component signals in a random manner. The feedback enhancement is limited by a "dither control" (FIG. 2 at 35a), so the increased noise signal is controlled to that level which will, when converted in the three separate color-band A-D converters, affect the least significant bit of the three (or two) bit signals for the color bands. This least significant bit will then dither, or change state somewhat randomly, so that a color transition in the lower intensity edge of each separate color-band signal will then change in a more or less gradual (and unpredictable) manner rather than by a step change as is characteristic of digital decoding. This sloped rate of change of the lower intensity border of each of the primary colors will produce a varying and somewhat random range of shades within the spectrum defined in the received video signal. Since this dithering of the least significant bit in each of the three color-band signals is gaussian in its distribution, the interaction of the independent signals will cross over the discrete color spot boundaries on the computer video card and produce many more than the standard 256 colors produced by a clean or noise-filtered video signal. Since the eye perceives the thirty-frame-per-second screen display as smooth motion, it will also blend the random variance of the color-edges between the red-green-blue pixels as many more slight variations or shades in color, in a number which cannot be accurately determined.

4. In converter (31), the video picture signal is separated into red, green and blue components. Each of these components is directed to a 7-digit digital-to-analog (A-D) converter (42,43, and 44) which continuously convert the analog video color component streams into seven-bit digital words, each separate stream defining a color component for display on the PC screen.

The red, green and blue color components (analog) are directed to analog multiplexer (mux, also called a 24-bit frame grab control) 41 which, as directed by system software (gate array transfer control 50 through the 12C link), selects between two color word modes for storage and display (see FIG. 1): a: In what may be termed the real time (eight-bit color) mode, analog mux 41 directs A-D converter 42 to the eightbit color mode. In this mode, the green component signal is transferred by analog mux 41 to A-D converter 42, while the red signal goes direct to A-D converter 43 and the blue signal to A-D converter 44. Data buffer 46 continuously accepts eight-bit color words (three red, three green, two blue) and transfers them for storage in video frame memory 47, from which complete video frames are transferred to the host computer NuBus, as described subsequently.

Timing of processing the the A-D coversion and storage is based on the vertical sync pulse which begins each TV frame; eight-bit words are read out 256 for each line (in the larger size display) for 256 lines, clocked by the horizontal sync pulse (63.5 microsecond intervals). After a complete frame is stored in video frame memory 47 the computer is signalled and the DigiVideo waits for a command to transfer the picture frame. b. In an alternative mode providing a slow rate non-real-time display of much higher resolution (and many more color shades), analog mux 41 and data buffer 45 are commanded to assemble 24-bit color words, each of all one color (21 color bits from three seven-bit words, plus three dummy bits). Mux 41 selects the proper color component and transfers it to A-D converter 42, which provides seven-bit color words to data buffer 45 for storage in memory 47. In this mode, an entire frame of red signals assembled and transferred to the computer, then a frame of green, then of blue. Software provided with the invention for the Macintosh provides for display of a resultant high-resolution color frame at a slow repetition rate, in what might be considered a freeze frame mode. It might be noted the dither circuit has very little effect in this color mode.

5. Data transfer to the PC is controlled by the Xilinx programmable gate array, according to instructions loaded at power on as initially described.

a. When a complete TV picture has been assembled in the memory, the DigiVideo transmits a signal to the PC processor that a picture frame is ready.

b. When the main PC program is ready to read the picture for display, it addresses the DigiVideo by a signal known in Macintosh language as "myslot", initiating data readout from that source in time intervals of 500 nanoseconds |ns| each.

b. During the allotted 500 ns interval , the MicroTv receives a clock signal every 100 ns from the Macintosh PC:

on the "myslot" pulse, the controller in the invention's novel data transfer stage directs transfer of video data from the RAM to four output registers or buffers, the first three of which are uni-directional latched buffers, the fourth being bi-directional. On each of the the four successive clock counts at 100 ns intervals, an eight-bit data word describing a pixel of information is transferred in parallel into one of the four eight-bit output registers, in order. On the fourth clock pluse in addition to loading the data word in the fourth buffer, the controller directs output in parallel of all four words to the PC which accepts them in correct order as one 34-bit word for Macintosh processing. The DigiVideo then ackowledges and signals ready again.

c. The PC continues to address the DigiVideo under its program control, each sample time being 500 ns, during which time four pixels are transferred as described in 7 above, the sample rate being determined by program rate and relative priority, as described below. When the complete picture has been read, the MicroTv assembles another complete frame in its RAM, signals the PC that a complete picture is ready and the process repeats under control of the PC program.

To read out data for a 128×128 pixel array, the above-described 500 ns readout cycle must occur 4096 times per complete picture frame, or 122,880 times per second, which amounts to slightly over six one-hundredths of a second (or 6% of machine time) consumed in this data transfer process. For a display array of 256×256 pixels, these numbers are correspondingly 16384 times per picture frame, or 491,520 times per second, approximately 24% of machine time. Internal PC processing time is additional, and display of the picture may consume a significant part of the PC operating cycle, particularly for the 256×256 pixel picture.

The data output transfer sequence (DOT for short) is precisely the same in the color and in the earlier black and white models. In the earlier models, readout and storage control is exercised by a PAL (programmable array logic) which has the control sequence permanently "burned" in. See below for code. In the color model, as described above, a Read Only Memory (51) supplies the program both to the gate array circuit 50 for internal control and to the computer as a NuBus driver. Communication with the Macintosh are through a bi-directional buffer 55—see FIGS. 3 and 5.

Original IBM machines used either an eight-bit or sixteen-bit word, however computers appear almost daily with increased speed and capacity.

For example, the original IBM PC, using eight-bit words at 4.77 megahertz (MHz) operating speed, could only read receive one word at a time, so the multi-word output buffer circuit would not help. That particular machine could not display a real time picture. Internal PC processing, not included in this invention, could provide a slower than real time picture display. Later models of IBM machines operate at higher speeds and have progressed to longer operating words, which could provide real time display.

Other computers recently appearing on the market feature greatly higher operating speeds and some besides the Macintosh now use thirty two bit words, so the preferred mode of the invention described herein could be directly adaptable to them, depending on internal logic, clock frequency and processing mode.

Again, internal machine processing time for display must be considered to determine utility of the process.

A logic difference between the two types of machines requires attention. A Macintosh reads zero as "white" on its video card, while IBM reads a digital one as white. So the A-D converter in different versions of the the DigiVideo must accomodate this logic inversion.

BRIEF DESCRIPTION OF THE DRAWINGS

In FIGS. 1, 3 and 5 double lines indicate digital data transfer in parallel; data transfer is indicated on FIG. 4.

DESCRIPTION OF THE PREFERRED EMBODIMENT

[This detailed description will apply to the color version of the invention specifically adapted to the Macintosh II or subsequent models in that series. Adaptability of the invention to the IBM type machines has been indicated hereinbefore, but will not be discussed in detail.]

Figure 6:
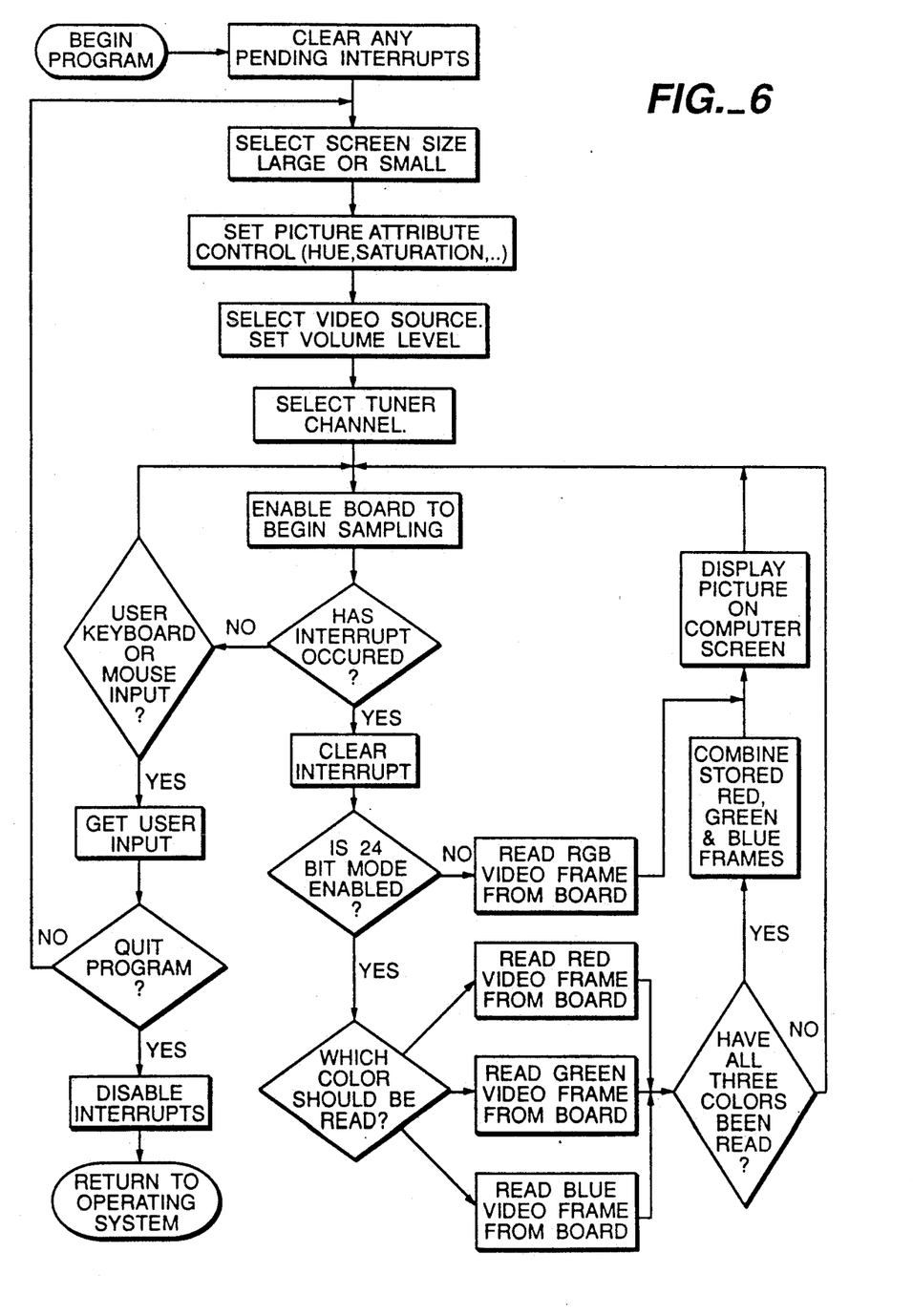
FIG. 6 is the software flow diagram for operation of the DigiVideo and its readout by the Macintosh PC.

The operation of the DigiVideo is controlled by software provided with the machine. The flow diagram of operations is shown in FIG. 6, and the entire software program, which is in Read Only Memory (ROM) in NuBus driver and Xilinx configuration controller 51 is attached hereto as Appendix 1.

Figures 1, 1A:
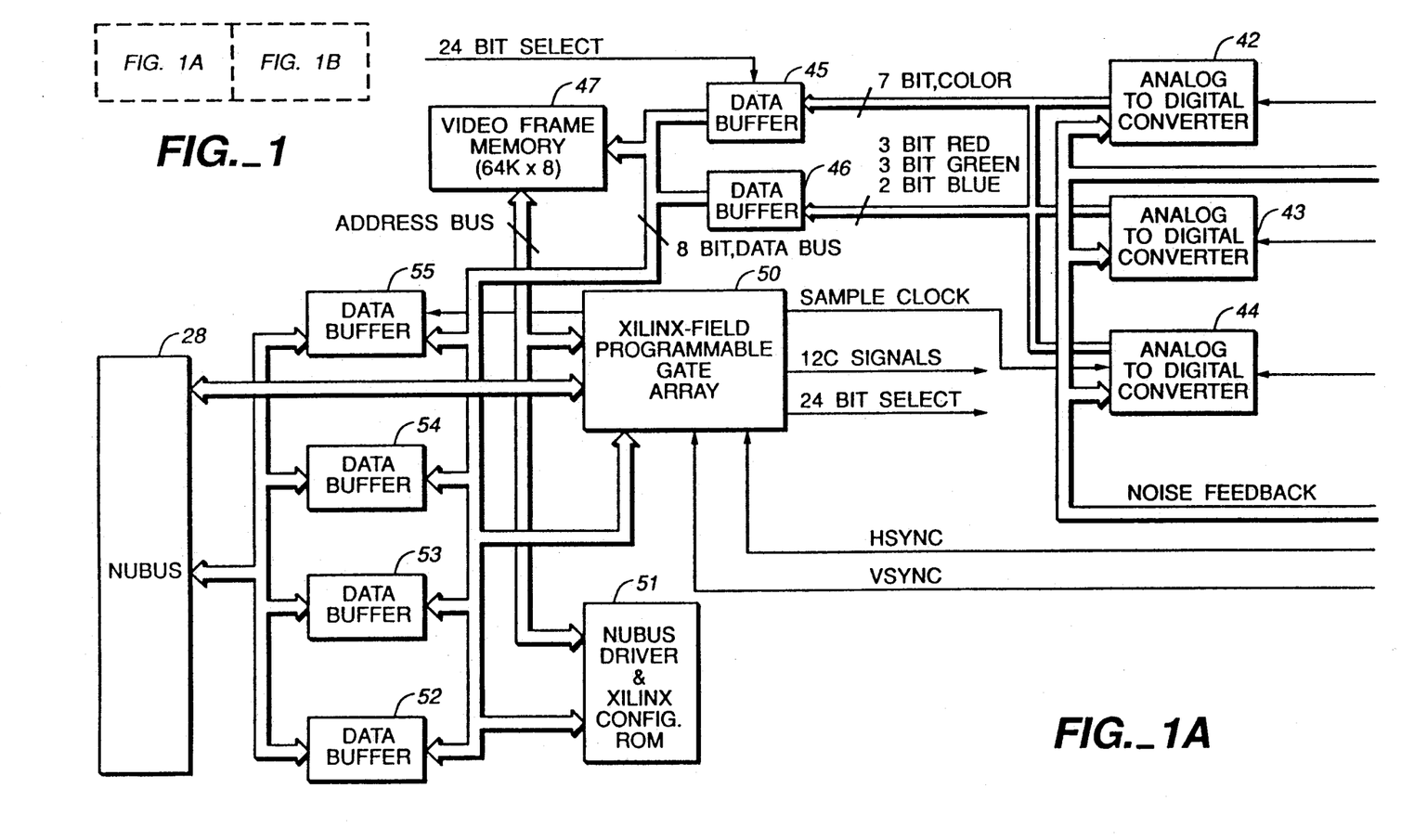
FIGS. 1, 1a and 1b are block diagrams of the invention in its color DigiVideo version, adapted as a data flow diagram, showing all components of the invention mounted on the plug-in card with the exception of the card connector to the PC, which is shown in FIGS. 3 and 5.
Figure 1B:
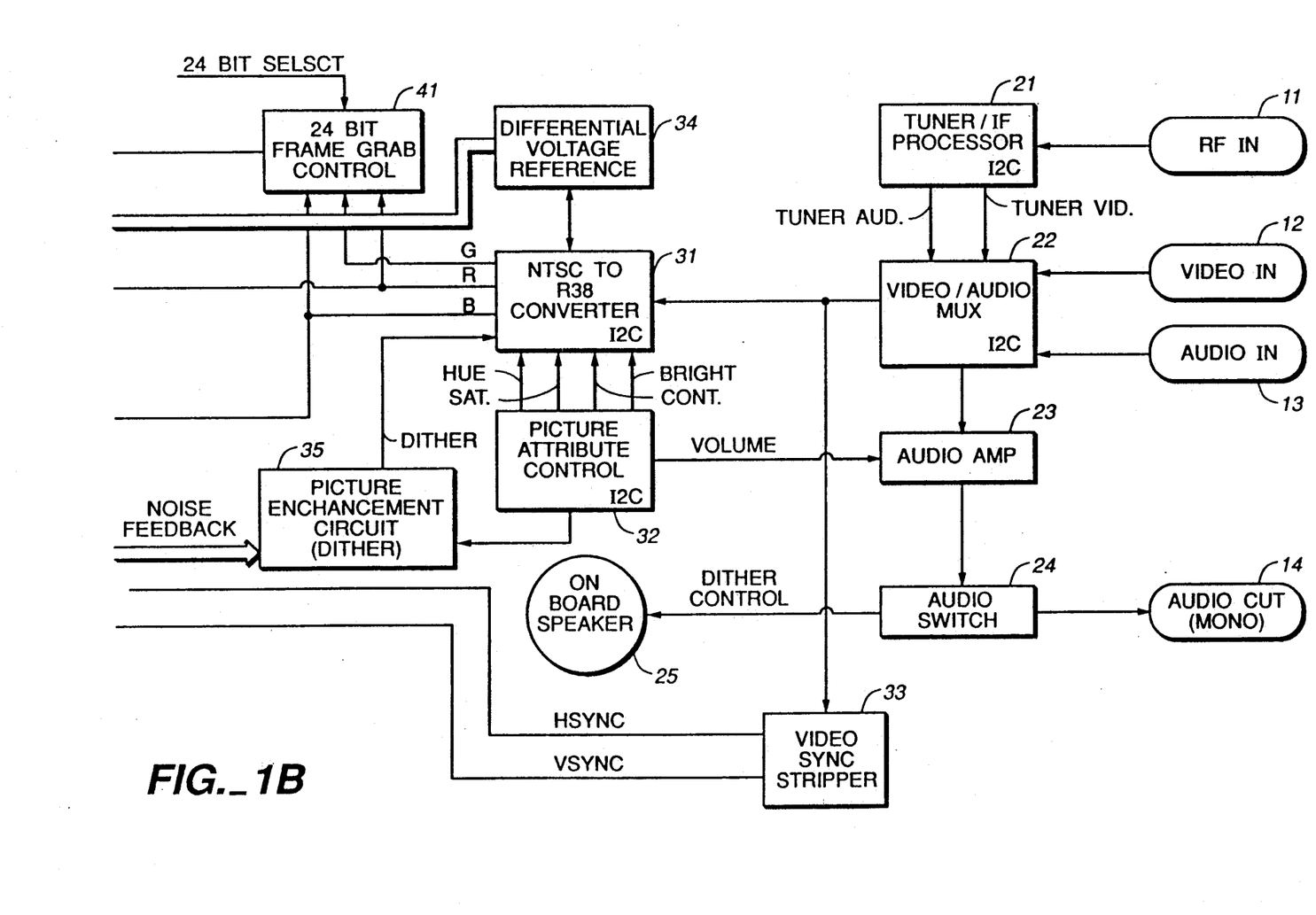

Referring first to FIG. 1, at the right of the figure the number 10 represents signal sources for the invention described herein, as well as an audio output monitor. At 11 is indicated connection of an antenna for reception of a standard TV broadcast signal, at 12 an alternate signal source, such as a video-cassette recorder, closed-circuit TV, or other analog source whose signal characteristics are compatible with analog TV signal processing. Also indicated are provisions for an external audio source 13 and an external audio monitor 14 which may be used by the invention. By external switching, not a part of the invention, more than one alternate source may be used.

Signal sources 11 and 12, are connected to the invention through F-type connectors, 13 and 14 by RCA pin-type connectors. These connectors are on the frame edge of the computer card 20 on which the invention is disposed. This is a standard card for the Macintosh II or subsequent models of that series of computers. The card dimensions are 4×13 inches (10.16×323.02 mm), with a 96-pin connector, indicated at 28, mating with the PC.

On the plug-in card 20 are disposed the elements of the color DigiVideo, which will be specified by part numbers. Additional discrete circuitry for voltage control is according to standard practice known to one skilled in the art.

A. A first processing stage, comprising an all-channel standard TV tuner combined with an intermediate frequency (I/F) processor 21, UV936, Phillips;

a switching control unit or video/audio multiplexer (mux) 22, TDA844ON;

an audio chain consisting of an amplifier 23, LM324AD, an audio switch 24 and a miniature loudspeaker 25, both of standard design, and an audio output plug;

B. A video processing stage:

video signal conditioner (NTSC to RGB converter) 31, TDA3567N;

picture attribute control 32, TDA8444N, which also provides audio volume control and a novel "dither" circuit (35) see FIG. 2 and discussion;

a differential voltage control 34, LM78L05, which supplies reference voltage (2 volts) for the analog to digital conversion;

C. Analog to digital conversion and storage stage;

a 24-bit "frame grab control" 41, 74HC4051, which selects, on command, either an 8-bit real time color mode or a slower 24-bit high resolution color frame display;

three identical seven-bit digital-to-analog (D-A) converters, 42, 43 and 44, (MC10321), one each for red, green, and blue color signals;

a data buffer 45, 74LS540 which transfers the color data frame to the RAM storage memory if the 24-bit color mode is selected;

a data buffer 46, also 74LS540, which transfers the color data to the RAM storage in the eight-bit mode, which is standard PC video color of three red bits, three green bits and two blue bits;

a video frame memory (RAM storage) 47, 43256-100, which stores a full video frame for readout to the PC;

D. The data transfer (data output transfer, or DOT) stage which delivers color data words to the computer;

a Xilinx field programmable gate array 50, XC2018PC84-70, which follows instructions loaded therein on power-up, and controls the operations of the DigiVideo, including data delivery (also referred to as a controller);

a NuBus driver & Xilinx configuration ROM 51, NS27C64-200. This circuit holds the instructions for gate array 50 as well as the software program for the Macintosh PC. On initial power-up of the DigiVideo, gate array 50 is configured and, on request from the PC, the NuBus driver containing all DigiVideo interface instructions is loaded therein through bi-directional buffer 55.

unidirectional data buffers 52, 53, and 54, (each 74F534) and bi-directional buffer 55 (74ALS640), which deliver four eight-bit words to the PC at one time as a 32-bit data word.

Referring to FIG. 2, a portion of the circuitry including NTSC to RGB processor 31 is shown. The novel dither control of the invention, the operation of which has been described in general above, is indicated herein at 35a and 35b.

The ground and reference voltage from the three color component A-D converters 42, 43 and 44, which after signal processing in those converters are now carrying a noise signal, are reintroduced into signal conditioner 31 as indicated at 35b. This noise signal, in a positive feedback mode, will cause the three color components to vary, or "dither" somewhat randomly, since the noise is gaussian in distribution. The dither control voltage signal, introduced through the network shown at 35a, to the filter and peak elements of the signal conditioner, limits the amount of variation allowed in the signal to that level which will, as previously summarized, cause the least significant bit to vary randomly. This dither is effective in the eight-bit color mode, but much less so in the 24-bit high resolution mode.

Figure 3:
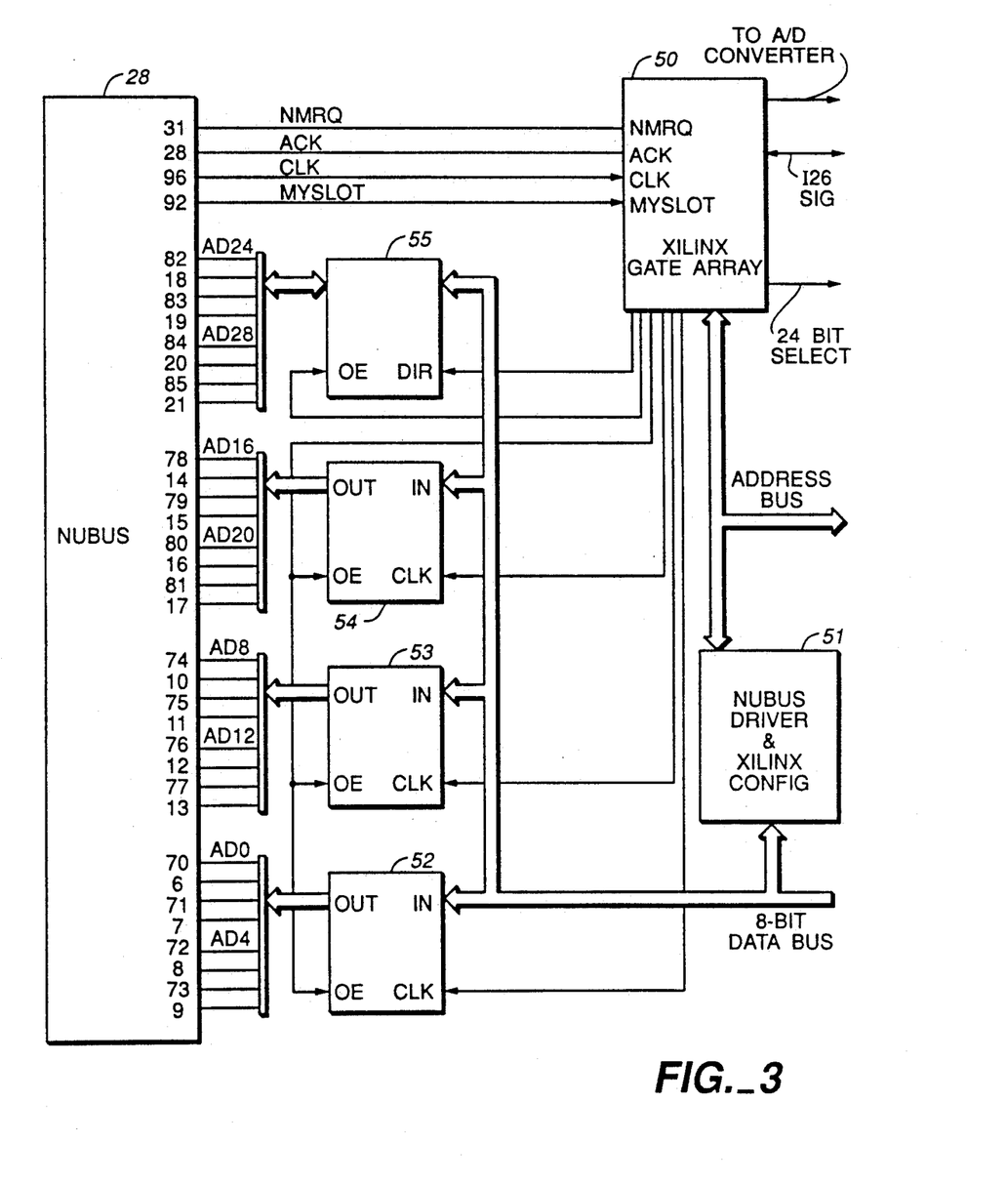
FIG. 3 is a block diagram of the novel data output circuit of the invention in its color version form, providing the capability to transfer the picture to the host PC in real time if the PC is capable of that speed.

Referring to FIG. 3, the elements of the invention's novel data transfer and control stage are shown to explain the operation of the device. Also shown, designated 28, is the 92-pin connector which mates the card to the Nubus in the Macintosh II PC. In FIG. 3, double lines represent data transfer in parallel over eight lines for the eight-bit words used to define picture pixels. The ultimate bit numbers for the final 32-bit word transferred to the Macintosh II are indicated by the corresponding pin numbers on connector 28 to which they are addressed, in four-bit groups (AD0, AD5, etc, through AD27). Control signal flow is shown in lighter lines.

Other than the four signals marked at the top of the figure, data transfer between the Macintosh and the DigiVideo are through bi-directional buffer 55.

The elements of this novel input-output control and data transfer device are stated above.

Communication of the invention with the PC is through connector 28. The following signals are required for control and data transfer:

a signal called NMRQ (non-maskable interrupt data request), is sent by controller 50 to the PC via pin 31 of connector 28, to inform the PC that a complete picture frame is ready in the RAM for transfer;

the signal called "myslot" in Macintosh language, is received by the invention (controller 50) on pin 92;

the clock signal (every 100 ns) is received on pin 96 to go to the controller 50, and provided by the controller to the other elements of the DigiVideo which are clock synchronized;

the "ready" or "acknowledge" is returned on pin 28;

address code and I2C control signals are received on the eight pins designated which communicate with bi-directional buffer 35 (pin-pairs 82 & 18, 83 & 19, 84 & 20 and 85 & 21). The eight-pin data bus as designated on FIG. 2 goes to the memory 47 and the IIC controller 27 shown in FIG. 1, previously described.

On "myslot", controller 50 directs transfer of four eight-bit words, each defining one pixel of picture information, from the RAM 47 to the four output buffers or registers 52 through 55 inclusive.

Figure 5:
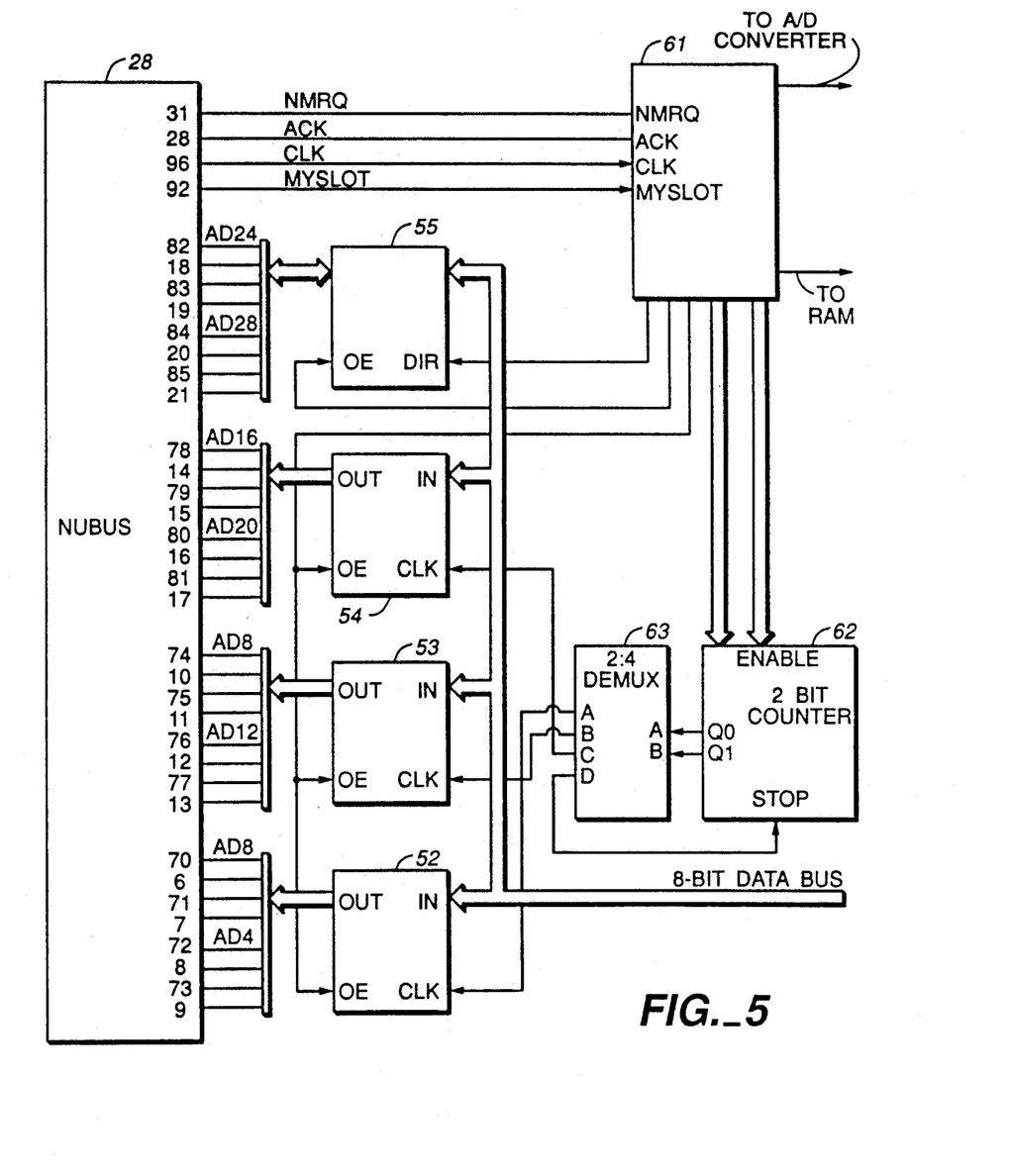
FIG. 5 is the black and white version of the data output circuit.

The controller switches "myslot" and counts and switches the first three clock signals in succession to registers 52, 53, and 54. On each clock pulse one eight-bit word is loaded in parallel into the register addressed by that particular clock pulse. On the fourth clock pulse the controller 50 switches the data flow direction for register 55 to output and directs loading of the fourth data word in that register in parallel. On that same fourth clock pulse controller 50 sends the output enable signal to all four registers and the four eight-bit data words are read out to the PC in parallel over the thirty-two lines previously designated and shown in FIG. 3 (and 5). The controller also sends the "acknowledge" or "ready" signal back to the PC over pin 28 of connector 28, which signal means that four-word data transfer operation is complete and the invention is ready for the next "myslot", at which time the data transfer sequence just described is repeated until an entire frame is read out.

When the entire picture frame has been read out, controller 50 directs storage in the RAM 47 of another frame. When the next frame is assembled, the controller 50 notifies the PC (by sending NMRQ) that it is ready and waits for the next "myslot".

The signal flow and operation has been previously described under the disclosure of the invention, with control of internal operations being directed as previously described by the I2C control system.

VERSION OF INVENTION FOR BLACK AND WHITE PICTURE

The invention comprises a plug-in computer card of the same characteristics as previously described for the color version of the invention, and general observations made there apply herein.

The invention has the capability of providing to a PC for display on its screen a continuous black and white inset or overlay picture, as controlled by the operator through the PC with software provided with the invention. While the mode of processing is essentially unchanged, the invention is available in two models providing different capabilities: the MicroTV provides a display of 128×128 pixels; the DigiVideo version has a switchable output to provide either 128×128 pixels or 256×256 pixels, depending upon the machine and software with which it is used. This discussion is primarily addressed to use with the Macintosh II series of computers.

The input connectors are as previously described for the color version, as is the basic processing chain, except that it is simpler for a black and white picture. The system elements are largely discrete circuits available, with external networks of standard design to provide proper functioning.

Figure 4:
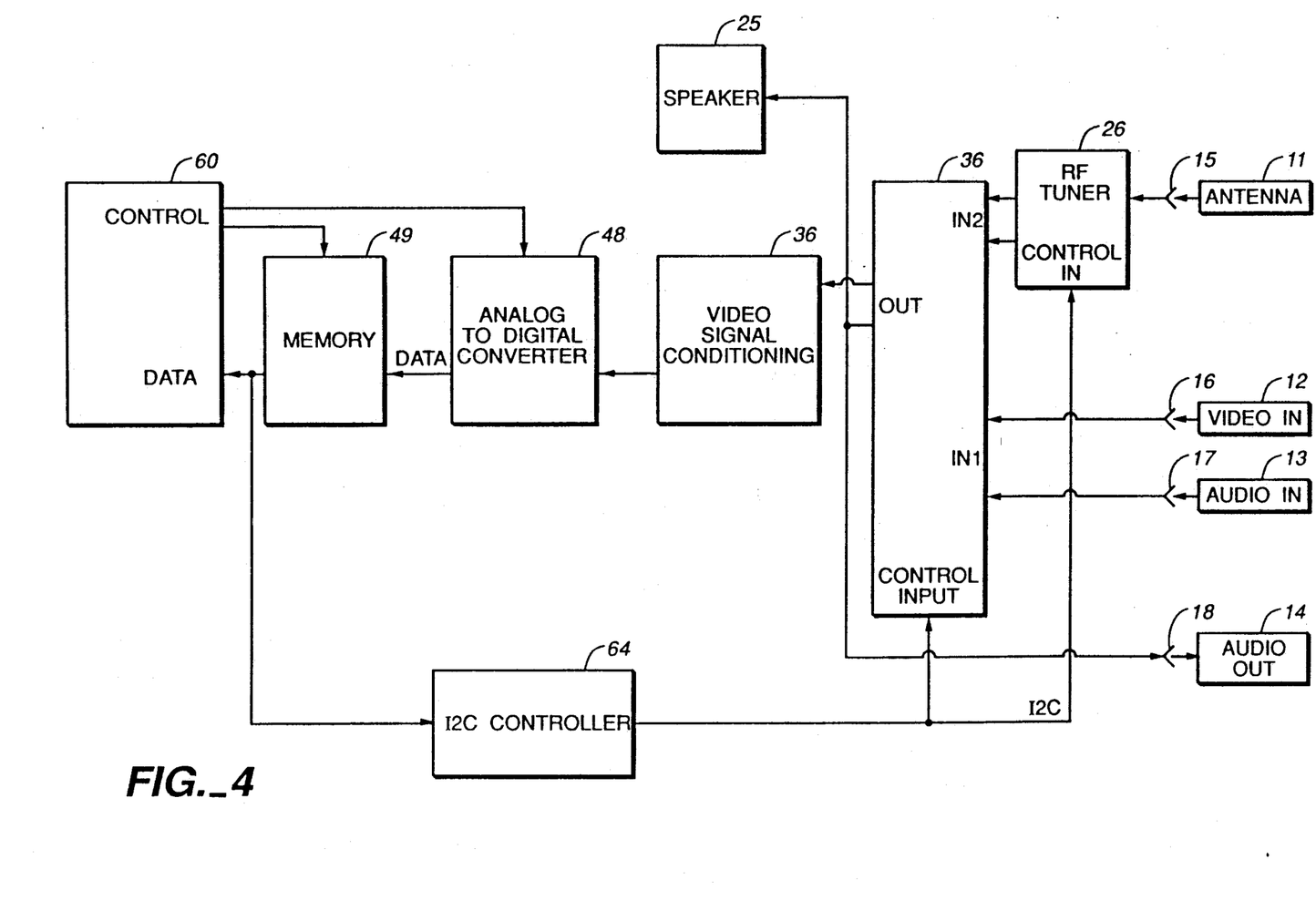
FIG. 4 is a block diagram of the black and white version of the invention, analogous to FIG. 1.

In summary, referring initially to FIG. 4, the MicroTV standard plug-in card for the Mac-Intosh II connects with the Macintosh internal processing bus designated as the NuBus. The sequence of processing within the invention includes the following steps:

1. The desired channel of TV reception may be selected by keyboard control, or with the mouse, using software provided with the invention and installed in the PC. The software provided for tuning the TV tuner by voltage control oscillator, utilizing "look-up" tables for the control frequency for each channel and for the voltage to the VCO to tune that frequency, actual control of the tuner being through the I2C controller 64 (74LS378), using a clock line and a signal pulse line. The tuner is a commercially available component, Samsung EBC-1731AL. The tuner or alternate source signal is switched by a switching network 27, of discrete circuitry of standard design. The audio signal included in the TV or other source signal is received separately from the tuner or RCA pin-plug and is routed to either an internal miniature speaker mounted on the card or to the output pin plug mentioned above.

The audio speaker is a standard miniature, of which many are available.

Frequency control and stability are provided by the phase-locked-loop design of the tuner utilized.

2. The video component is switched to a video signal conditioning circuit 36 (a combination of discrete circuitry and standard chips, comprising essentially a low-pass filter limiting the signal which passes through to that portion of the TV picture signal below 3.5 MHz). This signal processor strips the signal of any components other than its luminance (black and white) elements, to restrict the signal to the gray scale section of the PC video card.

3. An analog-to-digital (A-D) converter 48 (MC10321) continuously converts this processed analog signal to digital format. The encoded 8-bit digital words (each representing one pixel of video display coded for the necessary gray scale area signal from the PC video color card) are stored temporarily in internal random access memory (RAM) 26 (43256-100), prior to readout by the novel data output transfer section of the invention, which functions in the black and white version precisely as previously described for the color version, except that its control elements are less flexible. In the smaller model of the invention, called the MicroTV, which is capable of providing a 128×128 pixel array to the PC, this RAM storage uses about half of a standard 32 kilobit (32K) matrix. The Digivideo model, which provides a 256×256 pixel array, uses two 32 kilobit matrices for storage.

Referring to FIG. 5, the invention's novel data transfer and control stage for the black and white model, which was indicated as 60 in the system block diagram FIG. 4, are shown to explain the control of this version of the device, which functions exactly as described previously for the color version.. Also shown, designated 28, is the 92-pin connector which mates the card to the Nu-bus in the Macintosh II PC. In FIG. 5, double lines represent data transfer in parallel over eight lines for the eight-bit words used to define picture pixels. The ultimate bit numbers for the final 32-bit word transferred to the Macintosh II are indicated by the corresponding pin numbers on connector 28 to which they are addressed, in four-bit groups (AD0, ADS, etc, through AD27). Control signal flow is shown in lighter lines.

The elements of this novel input-output control and data transfer device are, in addition to a programmable array logic state machine or controller 31, a 2-bit counter 62 (74F163), a 2:4 demultiplexer 63 (74F139), three uni-directional eight-bit latched data registers or buffers 52, 53, and 54 (74F534) and a bi-directional eight-bit register 55 (74F640). The logic state machine 31 is part No. PAL 16R4, which is configured by having its switches "burned" by a program, for which see below.

Communication of the invention with the PC is through connector 28. The following signals are required for control and data transfer:

a signal called NMRQ (non-maskable interrupt data request), is sent by controller 61 to the PC via pin 31 of connector 28, to inform the PC that a complete picture frame is ready in the RAM for transfer;

the signal called "myslot" in Macintosh language, is received by the invention on pin 92 and is routed to both the controller 61 and the 2 bit counter 62;

the clock signal (every 100 ns) is received on pin 96 to go to the controller 61, and the 2-bit counter 62, it is also provided by the controller to the RAM 49 for synchronization;

the "ready" or "acknowledge" is returned on pin 28;

address code and I2C control signals are received on the eight pins designated which communicate with bi-directional buffer 55 (pin-pairs 82 & 18, 83 & 19, 84 & 20 and 85 & 21). The eight-pin data bus as designated on FIG. 2 goes to the memory 26 and the I2C controller 64 shown in FIG. 4, previously described.

On "myslot", controller 61 directs transfer of four eight-bit words, each defining one pixel of picture information, from the RAM 49 to the four output buffers or registers 52 through 55 inclusive.

Two-bit counter 62 receives "myslot", and then the four clock signals, which it routes in succession to the 2:4 demultiplexer 63. The demultiplexer counts and switches the first three clock signals in succession to registers 52, 53 and 54. On each clock pulse one eight-bit word is loaded in parallel into the register addressed by that particular clock pulse. The fourth clock pulse is switched by the demultiplexer 63 back to the 2-bit counter 62, which turns off.

On that fourth clock pulse the controller 61 switches the data flow direction for register 55 to output and directs loading of the fourth data word in that register in parallel. On that same fourth clock pulse controller 61 sends the output enable signal to all four registers and the four eight-bit data words are read out to the PC in parallel over the thirty-two lines previously designated and shown in FIG. 2. The controller also sends the "acknowledge" or "ready" signal back to the PC over pin 28 of connector 28, which signal means that four-word data transfer operation is complete and the invention is ready for the next "myslot", at which time the data transfer sequence just described is repeated until an entire frame is read out.

When the entire picture frame has been read out, controller 61 directs storage in the RAM 49 or another frame. When the next frame is assembled, the controller 61 notifies the PC (by sending NMRQ) that it is ready and waits for the next "myslot".

The system output controller 61 is a programmable-array-logic (PAL) module, configured to direct the sequence or operations described previously by a PAL programmer in accordance with JEDEC code set forth immediately following:

```
ABEL(tm) 3.10 Data I/O Corp. JEDEC file for: P16R4 V7.0
Created on: 8-Nov-89 08:38 AM
AAPPS MACTV
NuBus state control pal -- p/n MTV-1 Revision 1.0*
QP20* QF2048*
ABEL(tm) 3.10 Data I/O Corp. JEDEC file for: P16R4 V7.0
Created on: 8-Nov-89 08:38 AM
AAPPS MACTV
NuBus state control pal -- p/n MTV-1 Revision 1.0*
QP20* QF2048*
L0000
11111111111111111111111111111111
11101111111111111111111101110111
11111111110111011011101011111111
11111111101111011101101011111110
00000000000000000000000000000000
00000000000000000000000000000000
00000000000000000000000000000000
00000000000000000000000000000000
11111111111111111111111111111111
11111101111111111111101110111
11111101111111011111111101111111
11111111101011001010101011111011
00000000000000000000000000000000
00000000000000000000000000000000
00000000000000000000000000000000
00000000000000000000000000000000
11111111101110111011100111111
11111111101111011101110101111
00000000000000000000000000000000
00000000000000000000000000000000
00000000000000000000000000000000
00000000000000000000000000000000
00000000000000000000000000000000
00000000000000000000000000000000
11111111101110111111101111111
10110111101111110111010111111
00000000000000000000000000000000
00000000000000000000000000000000
00000000000000000000000000000000
```

```
000000000000000000000000000000000
000000000000000000000000000000000
000000000000000000000000000000000
111111111101110111011010110111111
111111111101111010100110011111111
000000000000000000000000000000000
000000000000000000000000000000000
000000000000000000000000000000000
000000000000000000000000000000000
000000000000000000000000000000000
000000000000000000000000000000000
111111111100101011111010110111111
111111111101111011011101011111111
000000000000000000000000000000000
000000000000000000000000000000000
000000000000000000000000000000000
000000000000000000000000000000000
000000000000000000000000000000000
```

Aapps MicroTV & DigiVideo PAL Jedic Listing May 14, '90

```
000000000000000000000000000000000
111111111111111111111111111111111
111111111111111111111111101100111
111111111111111011111111101101111
111111111011010010110010111101111
000000000000000000000000000000000
000000000000000000000000000000000
000000000000000000000000000000000
000000000000000000000000000000000
111111111111111111111111111111111
111111111111111111111111101110110
111111111111111011111111101111110
111111111010110010110010111101111
000000000000000000000000000000000
000000000000000000000000000000000
000000000000000000000000000000000
000000000000000000000000000000000*
C5067*
*B9FF
```

The above disclosure of my invention, including the special data transfer circuit and its novel programmed control circuit is considered the best mode for carrying out its function. Minor variations are considered to be within the scope and limits of the invention, as defined in the claims set forth below.

I claim:

1. Apparatus for displaying on a monitor screen of a cooperating personal computer a color television picture at a frame repetition rate sufficient to show smooth motion in the displayed picture while the personal computer is processing other programs, said apparatus comprising a single plug-in card mating with an expansion slot in the personal computer, and providing connectors for an external antenna as well as alternate compatible signal sources, on said plug-in card being disposed:

an all-channel television tuner, providing video and audio output signals to a switching means adapted to switching these signals as well as alternate compatible signal sources;

audio signal processing and output means; as well as video signal processing means adapted to demodulate a received analog television signal and separate it into its red, green and blue components;

conversion means to continuously convert the red, green and blue components into digital color component signals;

picture control and enhancement means providing picture value controls, and additionally providing an enhancement of color values by an induced random variation of the digital color component signals so that displayed color shades vary in an unpredictable manner to produce many more discernible color shades than are provided by a normal computer pallette;

digital buffer means to assemble eight-bit digital words, each representing one color pixel for display containing standard color component display coding;

digital storage means of capacity sufficient to store one complete television picture frame made up of said eight-bit digital words, each said word defining one pixel of color picture information; and data transfer means adapted to transfer said digital words to a processing bus included in the personal computer through a plurality of output buffers adapted to substantially simultaneously transfer in parallel said plurality of said digital words to said personal computer's processing bus; still further including control means for data transfer adapted to communicate to said personal computer when a picture frame is ready, to control transfer from said digital storage means to said data transfer means output buffers when said computer requests data, loading each said buffer in parallel in succession, then directing substantially simultaneous transfer of data in parallel from all said buffers to said personal computer's processing bus as one computer word.

2. Apparatus as in claim 1 wherein said data transfer means is provided with such number of said buffers as required to be adapted to substantially simultaneously transfer in parallel data words of the correct length to a cooperating personal computer using data words of length other than thirty-two bits.

3. Apparatus for displaying on a monitor screen of a cooperating personal computer a black and white television picture at a frame rate sufficient to show smooth motion in the displayed picture while said personal computer is processing other programs, said apparatus comprising a single plug-in card mating with an expansion slot in said personal computer, and providing connectors for an external antenna as well as alternate compatible signal sources, on said plug-in card being disposed:

an all-channel television tuner, providing separate video and audio output signals to a switching means adapted to switching these signals as well as alternate compatible signal sources, audio signal processing and output means, as well as video signal processing means adapted to convert a received analog television signal to digital signals in the form of eight-bit digital words each representing one pixel of picture information for display on said personal computer's monitor screen, each word being formatted so as to be limited to a gray scale portion of a video card included in said personal computer, also including digital storage means of capacity sufficient to store one complete television picture frame made up of said eight-bit digital words each said word defining one pixel of picture information, and data transfer means adapted to transfer said digital words to a processing bus included in said personal computer through a plurality of output buffers adapted to substantially simultaneously transfer in parallel said plurality of digital words to said personal computer's processing bus as one digital word, still further including control means for data transfer adapted to communicate to said personal computer when a picture frame is ready, to control transfer from said digital storage means to said data transfer means output buffers when said computer requests data, loading each said buffer in parallel in succession, then directing substantially simultaneous transfer of data in parallel from all said buffers to said personal computer's processing bus as one computer word.

4. Apparatus as in claim 3 wherein said complete television picture frame constitutes 128 by 128 pixels of picture information.

5. Apparatus as in claim 3 wherein said complete television picture frame constitutes 256 by 256 pixels of picture information.

6. Apparatus as in claim 1 wherein said output buffers in said data transfer means comprise four eight-bit buffers adapted to substantially simultaneously transfer in parallel thirty-two data bits for use in a cooperating personal computer which uses data words of thirty-two bits.

7. Apparatus and method for color enhancement of pixels of picture data for a color television display on a screen of a cooperating personal computer while said computer is operating other programs wherein a picture attribute control means provides a control voltage limiting and controlling an effect produced by a feedback signal of noise generated in analog-to-digital conversion of color component signals that is reintroduced into a video signal processor in a positive feedback mode, causing the color component signals produced in said processor in digitally coded form to vary in a random and unpredictable manner so that a least significant bit of each color component signal changes in a random manner to produce more color shades.

* * * * *

UNITED STATES PATENT AND TRADEMARK OFFICE
CERTIFICATE OF CORRECTION

PATENT NO. : 5,249,164
DATED : Sep. 28, 1993
INVENTOR(S) : Mark C. Koz

It is certified that error appears in the above-indentified patent and that said Letters Patent is hereby corrected as shown below:

In FIG. 5 of the drawings of the Patent, immediately above and to the right of the number "70" that is located within the rectangular block "28", change "AD8" to --AD0--.

In column 1, line 44 of the Patent change "or" to --of--.

In column 10, line 19 of the Patent change "ADO" to --AD0--;

line 19 of the Patent change "ADS" to --AD4--; and line 20 of the Patent change "AD27" to --AD28--.

In column 12, line 28 of the Patent change ".." to --.--;

line 36 of the Patent change "ADO" to --AD0--;

line 36 of the Patent change "ADS" to --AD4--; and line 37 of the Patent change "AD27" to --AD28--.

In column 14, line 12 of the Patent change "or" to --of--.

In claim 1, column 15, line 66 of the Patent between "means" and ";" insert -- for processing the audio output signal--;

line 68 change "a received analog television" to --the video output--;

column 16, line 60 between "words" and "," insert -- from digital color component signals--; and

UNITED STATES PATENT AND TRADEMARK OFFICE
CERTIFICATE OF CORRECTION

PATENT NO. : 5,249,164
DATED : Sep. 28, 1993
INVENTOR(S) : Mark C. Koz

It is certified that error appears in the above-indentified patent and that said Letters Patent is hereby corrected as shown below:

line 60 following "each" insert --word--.

In claim 3, column 17, line 35 of the Patent between "means" and ";" insert -- for processing the audio output signal--;

line 37 change "a received analog television" to --the video output--; and column 18, line 7, change "," to --;--.

Signed and Sealed this

Twelfth Day of July, 1994

BRUCE LEHMAN

Attest:

Attesting Officer

Commissioner of Patents and Trademarks